(No Model.) 2 Sheets—Sheet 1.

E. HÄNISCH & M. SCHROEDER.
APPARATUS FOR EXTRACTING SULPHUROUS ACID.

No. 410,415. Patented Sept. 3, 1889.

WITNESSES: Henry Huber, Carl Kay

INVENTORS: Emil Hänisch and Max Schroeder
BY Goepel & Raegener
ATTORNEYS.

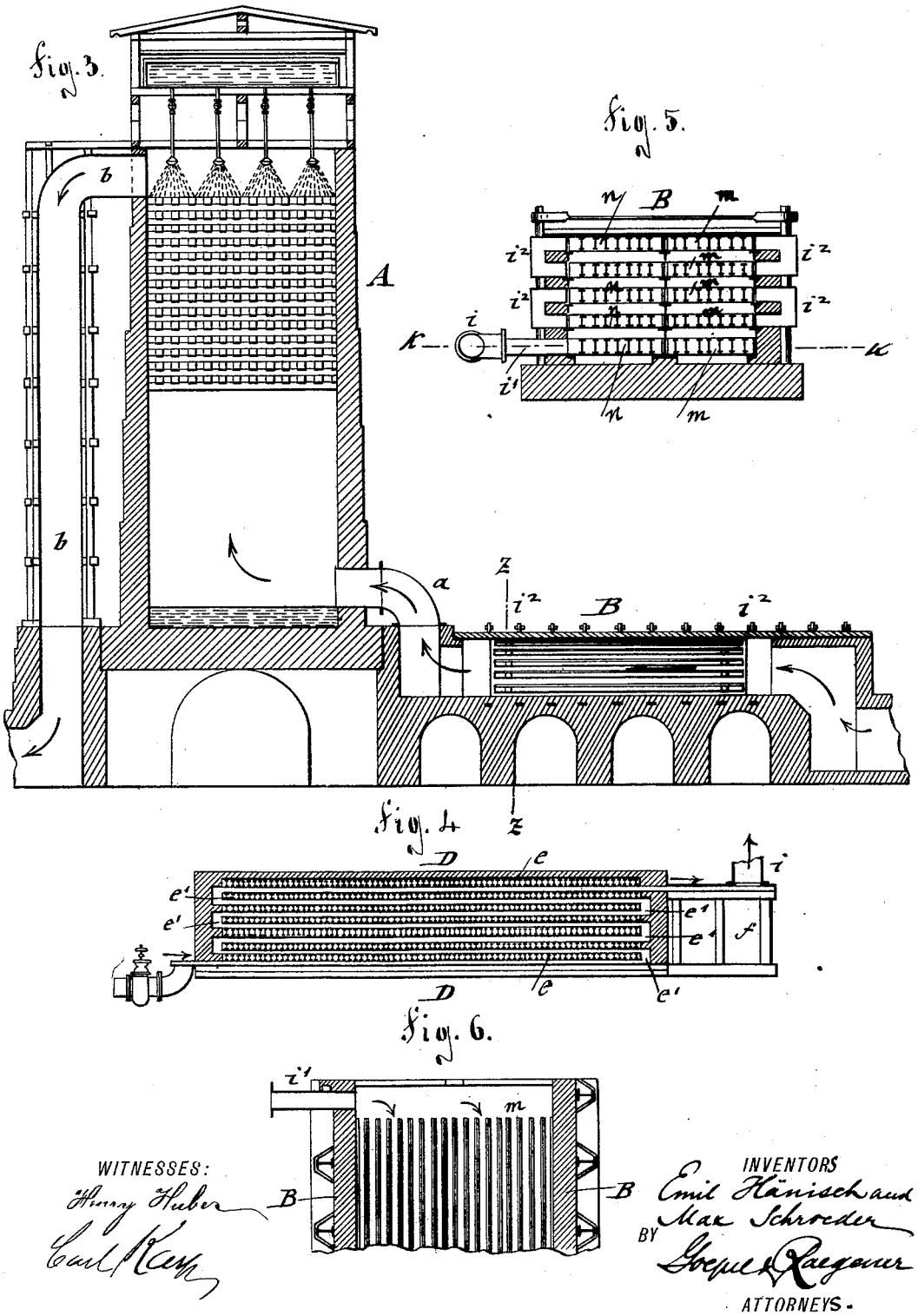

UNITED STATES PATENT OFFICE.

EMIL HÄNISCH, OF BEUTHEN O. S., AND MAX SCHROEDER, OF NEUMÜHL, GERMANY.

APPARATUS FOR EXTRACTING SULPHUROUS ACID.

SPECIFICATION forming part of Letters Patent No. 410,415, dated September 3, 1889.

Application filed September 18, 1888. Serial No. 285,712. (No model.) Patented in Germany January 18, 1883, No. 26,181, and November 23, 1883, No. 27,531, and in England May 26, 1883, No. 2,621.

*To all whom it may concern:*

Be it known that we, EMIL HÄNISCH and MAX SCHROEDER, respectively of Beuthen O. S. and of Neumühl, Hamborn, in the German Empire, have invented certain new and useful Improvements in Apparatus for Extracting Sulphurous Acid from Furnace-Gases, (which has been patented to us heretofore by the Government of Germany, No. 26,181, dated January 18, 1883, and No. 27,531, dated November 23, 1883, and by the Government of England, No. 2,621, of May 26, 1883,) of which the following is a specification.

This invention relates to an improved apparatus for extracting sulphurous acid by means of water from furnace-gases and other gaseous mixtures containing said acid and utilizing the absorbed sulphurous acid in the manufacture of sulphuric acid, sulphuric anhydride, and for other uses in the arts.

The invention consists, essentially, of a certain novel construction of heaters for the acidulated water employed in the apparatus for separating sulphurous-acid gas from furnace and other gases, as will be described in detail hereinafter, and finally pointed out in the claims.

Figure 1:
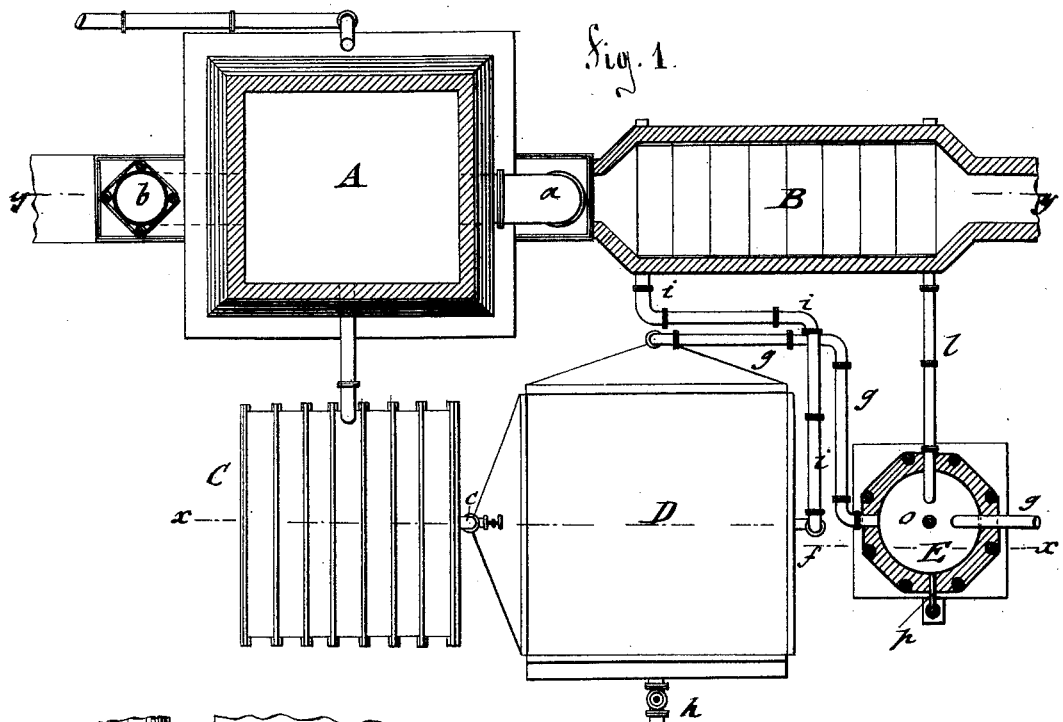
Figure 2:
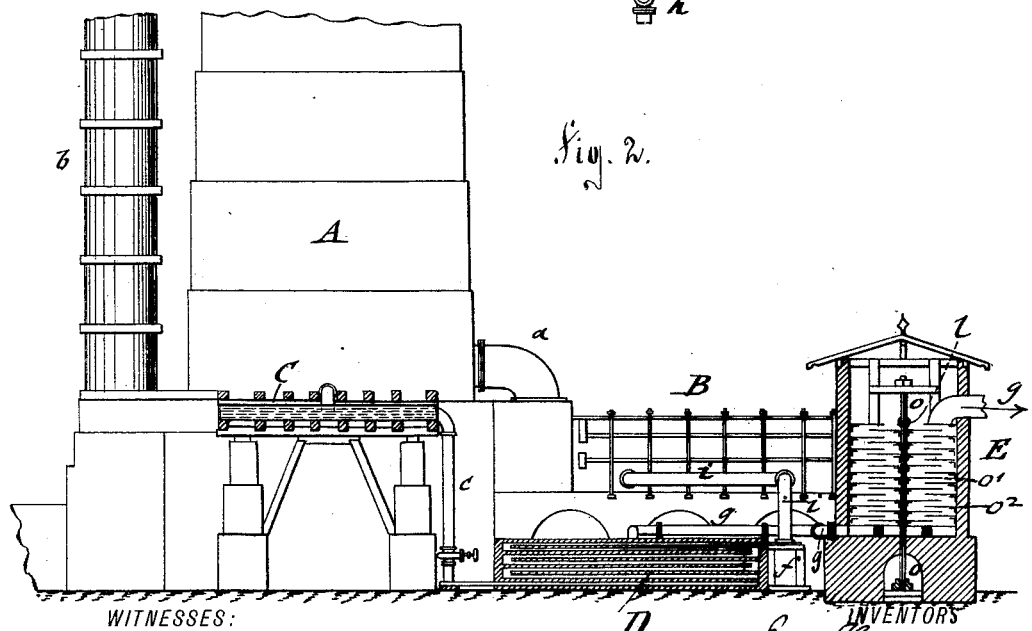

In the accompanying drawings, Figure 1 represents a plan of our improved apparatus for extracting sulphurous acid from furnace and other gases containing the same. Fig. 2 is a vertical longitudinal section on line $x$ $x$, Fig. 1, through the collecting-reservoir, preparatory heater, and the separating-tower. Fig. 3 is a vertical longitudinal section on the line $y$ $y$, Fig. 1, through the absorbing-tower and the main heating apparatus located in the widened gas-flue. Fig. 4 is a vertical longitudinal section through the preliminary heater, drawn on a larger scale; and Figs. 5 and 6 are respectively a vertical transverse section through the main heating apparatus on line $z$ $z$, Fig. 3, and a horizontal section of the same on line $k$ $k$, Fig. 5.

Similar letters of reference indicate corresponding parts.

The furnace or other gases are conducted through the widened flue in which the main heating apparatus B is located, and from the same through a curved tube $a$ to the lower part of an absorption-tower A, to the upper part of which cold water is supplied in a fine spray from a suitable reservoir by means of sprinklers. The gas passes in upward direction and in a counter-current to the descending water through the absorption-tower A, which is filled with lattice-work, wicker-work, or other equivalent devices for producing a large surface and obtaining a fine subdivision of the water. The sprayed water absorbs in the tower the sulphurous-acid gas contained in the furnace-gases, and passes off from the tower into a closed reservoir C, which is located somewhat below the bottom of said tower. Both the tower A and the reservoir C are supported high enough so that the water is under sufficient pressure to insure its passage through a preliminary heater D, as well as through the main heating apparatus B. The remaining gases are drawn off by means of a suction-fan from the upper part of the tower through a pipe $b$ and conducted off.

From the reservoir C the water containing sulphurous acid is conducted through a pipe $c$ to the lower part of the preliminary heater D, which consists of a number of square lead plates $e$, that are located above each other, so as to form a number of horizontal spaces of large surface and comparatively low height. The water passes in the lowest space from the left to the right, and is conducted at the right-hand end by a vertical connection $e'$ to the third space, then at the opposite end of the third space by a vertical connection $e'$ to the fifth space, and so on alternately in zigzag flues from the right to the left and back again from the left to the right around the intermediate spaces. The intermediate spaces serve for the passage of the hot water from which the sulphurous-acid gases have been separated, which water is conducted through the intermediate spaces in a direction at right angles to that of the cold water in the uneven spaces. The hot water enters the preliminary heater at one side through a pipe $g$, and passes from the top of the heater D downward to the lower part, leaving the heater D, through a pipe $h$, at the opposite side of the same, as shown clearly in Fig. 4. The lead plates, which form the preliminary heater D, are supported by transverse beams of lead, which are arranged in the even spaces through which the hot water is conducted as shown in Fig. 4, they being arranged in the direction of the current of the water, so that by the cross-currents the heat of the hot water is communicated through the lead partition-plates to the ascending cold water containing the sulphurous acid, which is thereby gradually heated in proportion as the hot descending water gives forth its heat. The acidulated water that is thus heated up in the preliminary heater leaves the heater at $f$, and is conducted by a pipe $i$ into the left-hand end of the main heating apparatus B, in which the heat of the furnace-gases is utilized for heating the water still more, while accomplishing at the same time a partial cooling of the furnace-gases.

The main heating apparatus B consists of a number of closed leaden vessels or pans $m$, placed one above the other at a suitable distance from each other, which leaden pans are of moderate height but considerable length, through which the water is to circulate alternately from the bottom upward. The water enters the lowest lead pan at $i'$ at the left end of the main heater B, as shown in Fig. 6, and passes in a direction opposite to the furnace-gases through longitudinal channels formed by leaden beams to the opposite or right end of the lower lead pan $m$, where it communicates by a transverse open part formed by shortening the lead beams, as at the left-hand end, with two bent side pipes $i^2$, then enters the next higher pan $m$ and circulates here from the front to the rear of the main heater, then by bent side pipes $i^2$ to the next higher pan $m$, and so on alternately until it escapes through the outlet-pipe $l$. The leaden pans $m$ are placed on iron beams which are let at the sides into the brick-work, and supported at the center by columns or other suitable supports. The furnace-gases pass longitudinally through the flat channels $n$, located intermediately between the pans $m$ in the direction of the arrows, Fig. 3, and heat the water in the pans above and below. The lead plates are protected from doubling up by leaden supports which are placed in the direction of the circulating water, but do not reach up to the front walls, so as to allow the water to enter freely into the separate compartments, as shown in Fig. 6. The water must be kept in this apparatus until it has attained a temperature of 100° centigrade. The flow of the water in the main heating apparatus is also caused by the pressure of the water in the higher situated reservoir C. The water after being heated to 100° centigrade now passes through the pipe $l$ into the upper part of the separating-tower E, the bottom of which is arranged somewhat higher than the upper part of the preliminary heater D, so that the separated hot water can run off through the pipe $g$ into the said apparatus. In the center of the tower E is arranged a vertical lead-covered iron rotary shaft $o$, which carries a number of horizontally-arranged sheet-iron disks $o'$, lined with lead. These disks are arranged alternately between the same number of rings $o^2$, of the same material, which are attached to the inner wall of the tower so as to alternate with the disks. A tube $p$ leads into the lower part of the tower, which tube serves for the supply of hot air, or preferably superheated steam. The hot acidulated water falling on the upper disk of the rotary shaft is thrown off by centrifugal force and falls upon the first ring and from there on the second disk, and so on until it reaches the reservoir below.

For producing pure sulphurous acid, the separation of the sulphurous-acid gases from the hot acidulated water is accomplished by passing superheated steam in a counter-current through the finely-subdivided spray produced by the action of the rotary disks as the hot water passes alternately from the same to the fixed rings. The supply of hot water and steam is regulated by suitable cocks or valves. The superheated steam is not absorbed by the hot spray water, but assists in generating steam from the same while accelerating the separation of the sulphurous-acid gases. The resulting mixture of sulphurous acid and steam is conducted by a pipe $g$ from the separating-tower E into a condensing-coil, (not shown in the drawings,) that is cooled by water, so that the steam is condensed. The water of condensation which contains some sulphurous acid is reconducted to the separating-tower E, while the sulphurous-acid gases are conducted off to be dried and finally collected in lead compartments in order that the same may be utilized for the production of sulphuric acid or applied to other technical purposes. The hot water collected in the lower part of the separating-tower E is conducted by a pipe $g$ to the hot-water channels of the preliminary heater D, and are utilized for heating up the acidulated solution passing through in the intermediate channels of the same.

The process herein described of extracting sulphurous acid has been claimed in a separate application filed January 9, 1888, Serial No. 260,169, to which reference is made.

Having thus described our invention, we claim as new and desire to secure by Letters Patent—

1. In an apparatus for separating sulphurous acid from furnace and other gases, a heater for the acidulated water composed of a series of horizontal chambers connected alternately at opposite ends, and a series of intermediate chambers divided by leaden beams into channels, through which the hot fluid passes in a counter-current to the flow of the acidulated water, substantially as set forth.

2. In an apparatus for separating sulphurous acid from furnace and other gases, the preliminary heater composed of a series of horizontal compartments or chambers connected alternately at opposite ends, and a series of intermediate spaces or chambers divided by transverse lead beams into channels which are also connected alternately at opposite ends, and inlet and outlet pipes at the ends 5 of both sets of chambers, so that the acidulated water ascends through one series of chambers, while the hot water descends through the intermediate chambers in a direction at right angles to the flow of acidulated 10 water, substantially as set forth.

In testimony that we claim the foregoing as our invention we have signed our names in presence of two subscribing witnesses.

EMIL HÄNISCH.
    MAX SCHROEDER.

Witnesses for Emil Hänisch:
 OSCAR GICHERT,
 FELIX STIRODA.

Witnesses for Max Schroeder:
 J. F. MONAGHAN,
 H. E. HAMMOND.